US010619808B2

(12) United States Patent
Serak et al.

(10) Patent No.: US 10,619,808 B2
(45) Date of Patent: Apr. 14, 2020

(54) FLAT PANEL CEILING LIGHT WITH QUICK-CHANGE COVERS

(71) Applicant: Good Earth Lighting, Inc., Mount Prospect, IL (US)

(72) Inventors: Christopher J. Serak, Burlington, WI (US); Brian A. Calderon, Skokie, IL (US)

(73) Assignee: Good Earth Lighting, Inc., Mount Prospect, IL (US)

( * ) Notice: Subject to any disclaimer, the term of this patent is extended or adjusted under 35 U.S.C. 154(b) by 0 days.

(21) Appl. No.: 15/787,484

(22) Filed: Oct. 18, 2017

(65) Prior Publication Data

US 2019/0113193 A1 Apr. 18, 2019

(51) Int. Cl.
| | | |
|---|---|---|
| *F21V 17/00* | (2006.01) | |
| *F21V 17/10* | (2006.01) | |
| *F21S 8/04* | (2006.01) | |
| *F21V 8/00* | (2006.01) | |
| *F21Y 115/10* | (2016.01) | |
| *F21V 17/14* | (2006.01) | |
| *F21V 5/06* | (2006.01) | |
| *F21V 17/12* | (2006.01) | |

(52) U.S. Cl.
CPC .............. *F21S 8/04* (2013.01); *F21V 17/002* (2013.01); *G02B 6/0031* (2013.01); *F21V 5/06* (2013.01); *F21V 17/105* (2013.01); *F21V 17/108* (2013.01); *F21V 17/12* (2013.01); *F21V 17/14* (2013.01); *F21Y 2115/10* (2016.08); *G02B 6/0088* (2013.01)

(58) Field of Classification Search
None
See application file for complete search history.

(56) References Cited

U.S. PATENT DOCUMENTS

| | | | |
|---|---|---|---|
| 2,258,354 A | 10/1941 | Doane | |
| 3,184,594 A * | 5/1965 | Siegel | F21S 8/04 248/317 |
| 5,128,850 A | 7/1992 | Juodvalkis | |
| 5,282,331 A | 2/1994 | Fell | |
| 5,355,604 A | 10/1994 | Rathke | |
| 6,508,578 B2 | 1/2003 | Yoda et al. | |
| D522,684 S * | 6/2006 | Schuyler | D26/142 |
| 7,686,470 B2 | 3/2010 | Chiang | |
| 7,828,465 B2 * | 11/2010 | Roberge | F21S 8/033 362/294 |
| 8,070,316 B2 | 12/2011 | Urano et al. | |
| 8,376,583 B2 | 2/2013 | Wang et al. | |
| 8,376,592 B2 * | 2/2013 | Engstrom | F21V 21/04 362/364 |
| 8,672,518 B2 * | 3/2014 | Boomgaarden | F21S 8/026 362/294 |

(Continued)

*Primary Examiner* — Christle I Marshall
(74) *Attorney, Agent, or Firm* — McDermott Will & Emery LLP

(57) ABSTRACT

Apparatus, method and system of lighting device including a lighting apparatus and a shade cover removably mounted to the lighting apparatus. The system comprises a light-emitting diode flat-panel ceiling light having a base frame, at least one light-emitting diode, and a light guide panel; and a shade cover. The base frame includes a quick-connect adapter through which the shade cover is removably mounted to the base frame without changing the light-emitting diode flat-panel ceiling light.

20 Claims, 14 Drawing Sheets

(56) References Cited

U.S. PATENT DOCUMENTS

| | | | |
|---|---|---|---|
| 9,004,718 B2 | 4/2015 | Myers et al. | |
| 9,022,631 B2 | 5/2015 | Mulder et al. | |
| 9,091,426 B2 * | 7/2015 | Bell | F21V 13/04 |
| 9,228,724 B2 * | 1/2016 | Wu | F21S 8/026 |
| 9,574,758 B2 * | 2/2017 | Ahn | F21S 8/036 |
| 9,803,836 B1 * | 10/2017 | Harpenau | F21V 17/101 |
| 9,835,300 B2 * | 12/2017 | Feit | F21S 8/061 |
| 2002/0140850 A1 * | 10/2002 | Toste | G08B 13/19619 |
| | | | 348/375 |
| 2013/0063932 A1 * | 3/2013 | Nussbaum | F21V 3/00 |
| | | | 362/184 |
| 2013/0272019 A1 * | 10/2013 | Engstrom | F21V 21/03 |
| | | | 362/581 |
| 2014/0085906 A1 * | 3/2014 | Keogan | F21S 8/02 |
| | | | 362/355 |
| 2015/0338038 A1 * | 11/2015 | Feit | F21S 8/061 |
| | | | 362/147 |
| 2015/0362159 A1 * | 12/2015 | Ludyjan | F21V 23/06 |
| | | | 362/277 |
| 2017/0066168 A1 | 3/2017 | Ludwig et al. | |
| 2017/0191628 A1 * | 7/2017 | Nelkin | F21S 8/026 |
| 2019/0063700 A1 * | 2/2019 | Lawrence | F21S 8/024 |

* cited by examiner

FLAT PANEL CEILING LIGHT WITH QUICK-CHANGE COVERS

TECHNICAL FIELD

This disclosure relates generally to an apparatus, method and system of a flat panel ceiling light, including quick-change shade covers installed with the flat panel ceiling light.

BACKGROUND

A light fixture is an electrical device used to create artificial light by use of an electric lamp. The light fixture is fixed in a position to a portion of a building, for example, a ceiling. The light fixture has a fixture body with a light socket for a lamp, or another type of light-generating element. A conventional light fixture has a fixed design and functionality. As design styles change over time, the conventional light fixture must be entirely replaced by installing a new light fixture with a new design. A person must hire an electrician to replace the conventional light fixture, or perform the replacement himself and risk causing damage to the new fixture during installation or himself from electrocution. In addition, during special occasions, the conventional light fixture design cannot be easily or quickly changed to match a mood of the special occasion, such as a holiday celebration. Therefore, there is a demand for a light fixture that facilitates the attachment of different decorative elements to the light fixture without changing the entire light fixture, thus enhancing the safety, utility and aesthetic benefits of the light fixture.

SUMMARY

One or more exemplary embodiments of the present disclosure are provided to solve the above problems and fulfill the above demand, including a lighting system which may comprise a light-emitting diode flat-panel ceiling light having a base frame, at least one light-emitting diode, a light guide panel; a decorative element; and a quick-connect adapter through which the decorative element may be removable mounted to the base frame without changing the light-emitting diode flat-panel ceiling light. The light-emitting diode flat-panel ceiling light may be wired to a junction box. Also, the light guide panel may be an edge-lit type.

In an exemplary embodiment, the quick-connect adapter may allow the decorative element to be quickly and easily mounted to the base frame, without using any tool. The quick-connect adapter may include bayonet type connections, threaded connections, hooks, hook-and-loop type connections, and magnets. The quick-connect adaptor may be formed on the base frame of the light-emitting diode flat-panel ceiling light.

In another exemplary embodiment of the present disclosure, the decorative element is a shade cover. The shade cover can be one selected from a plurality of replaceable shade covers with different functions and designs. The shade cover may be made of transparent material such as light guide material. The shade cover may be made of opaque material so that the shade cover diffuses or redirects the light emitted from the light-emitting diode. The shade cover may also be made of a fabric material that wraps around a wire frame. The shade cover may also hide the mounting structure, such as screws, used to mount the base frame to the ceiling.

In another exemplary embodiment of the present disclosure, the decorative element is a trim piece. The trim piece can be one selected from a plurality of replaceable trim pieces with different functions and designs. The trim piece may be made of a variety of materials such as steel, aluminum, brass, copper, titanium, plastic, acrylic, wood, glass, and fabric. Like the shade cover, the trim piece may hide the mounting structure, such as screws, used to mount the base frame to the ceiling.

In another exemplary embodiment of the present disclosure, the decorative element is a hanging element. The hanging element may comprise a base ring having a plurality of ornaments that hang from the base ring. The base ring can be the same design as the trim piece except it includes any number of standard attachments for the ornaments to hang from. The base ring may also be made of the same types of materials as the trim piece. The ornaments can be any number of decorative items having different functions and designs. The ornaments may be made of transparent material such as light guide material. The ornaments may be made of opaque material so that the ornaments diffuse or redirect the light emitted from the light-emitting diode. The ornaments may also be made of reflective material so that the ornaments reflect light emitted from the light-emitting diode in different directions. The ornaments may also be made of any number of different materials for other aesthetic or design purposes and functions.

In yet another exemplary embodiment, the decorative element may have a quick-connect adapter. The quick-connect adapter may allow multiple decorative elements to be quickly and easily mounted to one another, without using any tool. For example, a trim piece may be mounted to a shade cover via the quick connect adapter on the shade cover, which itself is mounted to the base frame via the quick-connect adapter on the base frame. In this way, a user may quickly and easily attach a variety of decorative elements to one another as well as to the base frame of the lighting apparatus.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
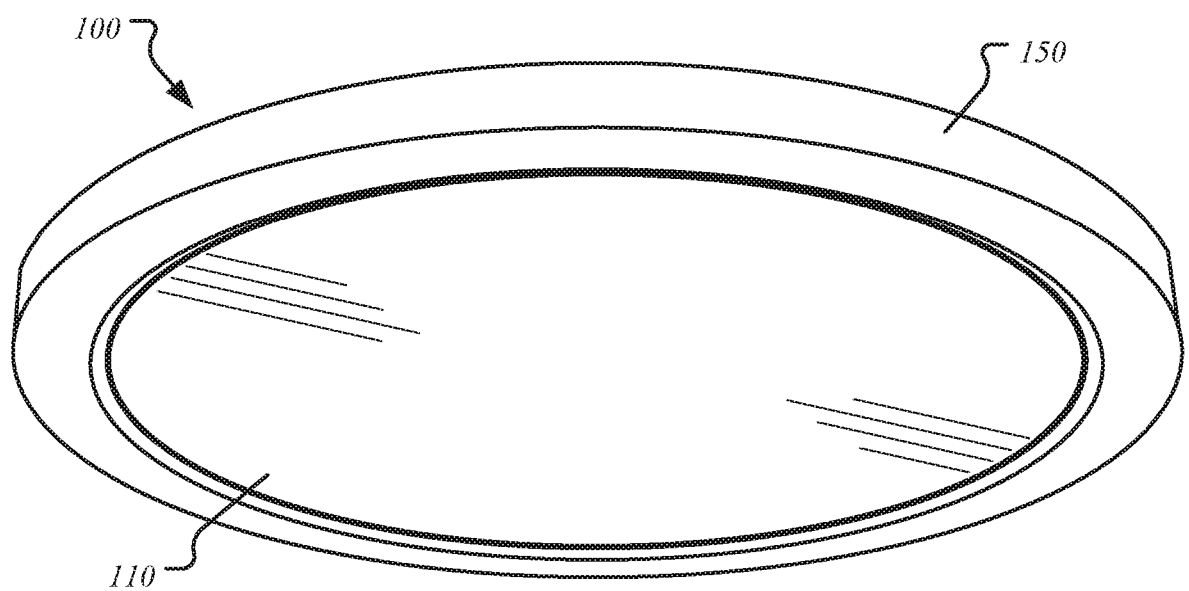
FIG. 1 illustrates an exemplary embodiment of the flat panel ceiling light (lighting apparatus) according to exemplary implementations of the present disclosure.

It is to be understood that the following disclosure provides many different embodiments, or examples, for implementing different features of the disclosure. Specific embodiments or examples of components and arrangements are described below to simplify the present disclosure. These are merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed, interposing the first and second features, such that the first and second features may not be in direct contact. Various features may be arbitrarily drawn in different scales for simplicity and clarity.

Further, spatially relative terms, such as "beneath," "below," "lower," "above," "upper" and the like, may be used herein for ease of description to describe one element or feature's relationship to another element(s) or feature(s) as illustrated in the figures, but are not intended to be limiting. The spatially relative terms are intended to encompass different orientations of the device in use or operation, in addition to the orientation depicted in the figures. The device may be differently oriented (rotated 90 degrees or at other orientations), and the spatially relative descriptors used herein may likewise be interpreted accordingly. In addition, the term "made of" may mean either "comprising" or "consisting of."

FIGS. 1, 2, 3, and 4 illustrate a lighting apparatus which may comprise a base frame 100; at least one light-emitting diode 130 (not shown); a light guide panel 110; and a quick-connect adapter 120 through which a decorative element (e.g., trim piece 150 in FIGS. 1 and 2) may be removably mounted to the base frame 100 without changing the lighting apparatus.

Figure 2:
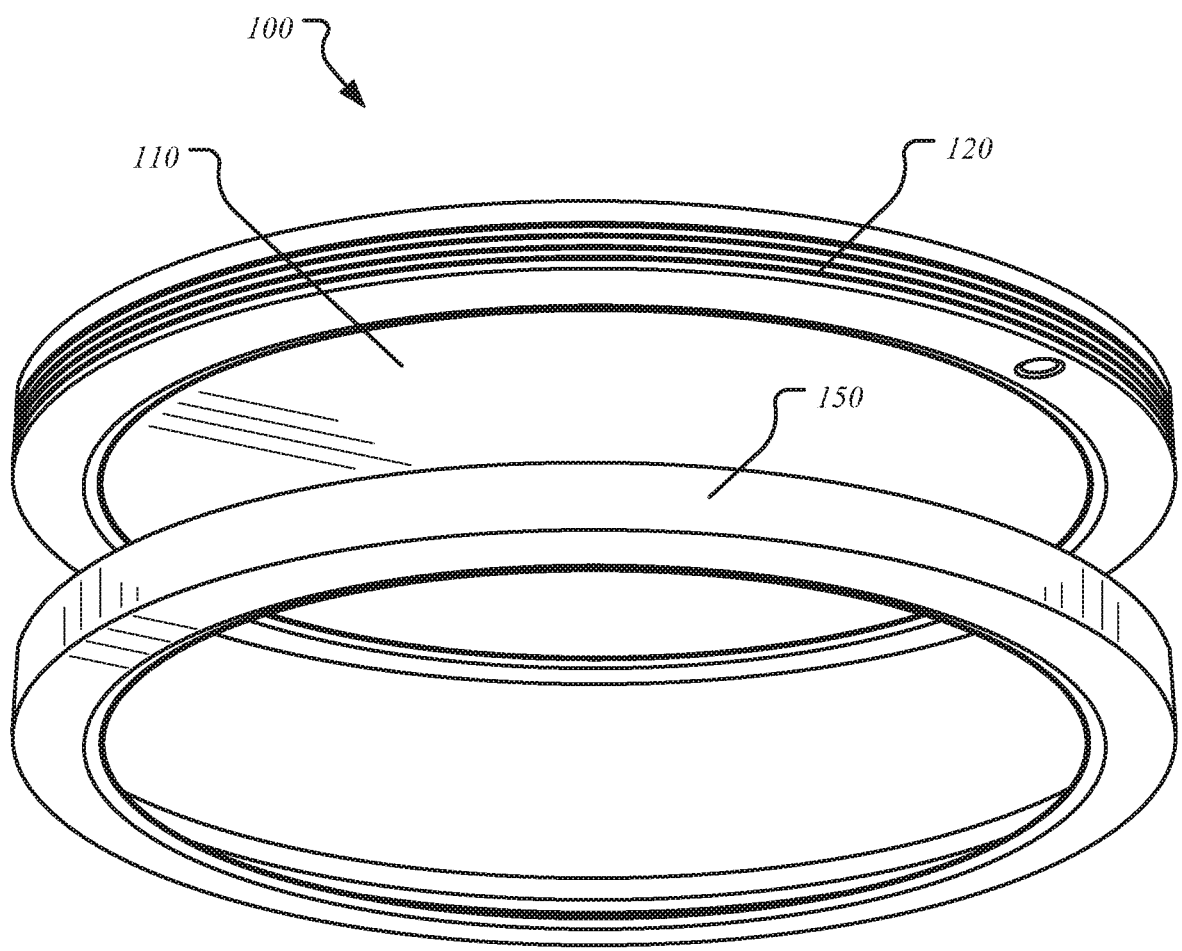
FIG. 2 illustrates the exemplary embodiment of the flat panel ceiling light (lighting apparatus) according to exemplary implementations of the present disclosure in FIG. 1 with the decorative element detached.

FIG. 2 illustrates that in the lighting apparatus, the at least one light-emitting diode 130 may emit light to an edge of the light guide panel 110 which outputs the light from a major bottom surface of the light guide panel 110. The light-emitting diode 130 may be any type of light-emitting diode including an organic light-emitting diode. The light intensity of the light-emitting diode 130 may be fixed. In some embodiments, the light intensity of the light-emitting diode 130 is adjustable. The color of light may be fixed or adjustable by mixing lights of base colors (e.g. red, green, and blue) of different intensity and wavelength. In other embodiments, the color temperature of the light may be fixed or adjustable by changing the Kelvin temperature of the at least one light-emitting diode. The number of light-emitting diodes 130 may be one, four, or any number to surround the light guide panel 110. The number of light-emitting diodes 130 may also depend on the power load requirement or the light output requirement.

In certain embodiments, a motion sensor 190 (not shown) is disposed on the lighting apparatus. The motion sensor 190 may be a passive infrared or PIR sensor or any other type of sensor that can detect movement within a range of motion detection. When the motion sensor detects movement within its range of motion detection it activates the light-emitting diode 130. The motion sensor 190 may be mounted to a portion of an outer surface of the base frame 100. Alternatively, the motion sensor 190 may be mounted to a portion of a bottom surface of the base frame 100. The motion sensor 190 may be in a fixed position having a set range of motion detection or the motion sensor 190 may be rotatable and pivotable such that a user can adjust the range of motion detection. It is to be understood that more, fewer or alternate arrangements of motion sensors are within the scope of this disclosure.

The light guide panel 110 is formed of an optical waveguide material such as a dielectric material or a nanostructured material. The light guide panel 110 directs the light received from, for example, an edge of the light guide panel 110 to a major surface of the light guide panel 110. The light guide panel 110 has a flat surface. In some embodiments, the light guide panel 110 has a curved surface. Along with internal reflections inside the light guide panel 110, the light guide panel 110 outputs homogeneous light. In some embodiments, the light guide panel 110 may be formed to focus on a certain region so that the cone of light emitted from the light guide panel 110 has less than 180 degrees.

FIGS. 1, 2, 3, 4A, and 4B illustrate that the base frame 100 may made of at least two parts. In some embodiments, the base frame 100 may be integrally formed into one piece. The base frame 100 may include a slot to which at least one light-emitting diode 130 is installed. The base frame 100 may be formed of a transparent material so that the light may also be outputted from the outer surface of the base frame 100. The transparent material may include a light guide material, such as glass and/or plastic, although other materials or arrangements are possible. The base frame 100 may be formed of an opaque material so that the light may not be outputted from the outer surface of the base frame 100. The opaque material may include organic and inorganic materials such as polymer, metal and ceramic materials and composites.

Figure 4A:
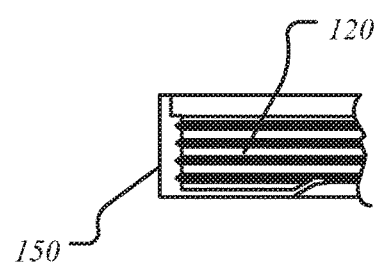
FIG. 4A illustrates a partial cross-sectional view of the exemplary embodiment of the flat panel ceiling light (lighting apparatus) according to exemplary implementations of the present disclosure in FIG. 1.
Figure 4B:
FIG. 4B illustrates a cross-sectional view of the exemplary embodiment of the flat panel ceiling light (lighting apparatus) according to exemplary implementations of the present disclosure in FIG. 1.
Figure 8:
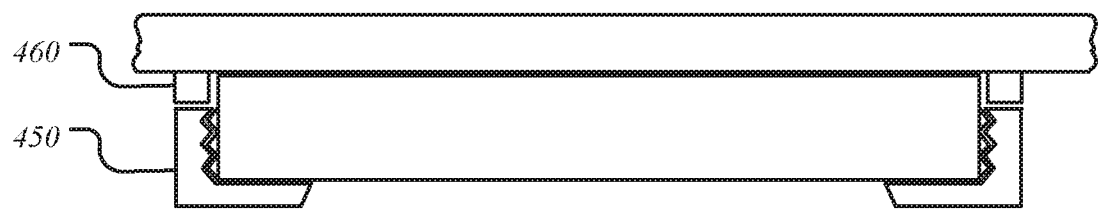
FIG. 8 illustrates a cross-sectional view of another exemplary embodiment of the flat panel ceiling light (lighting apparatus).
Figure 9:
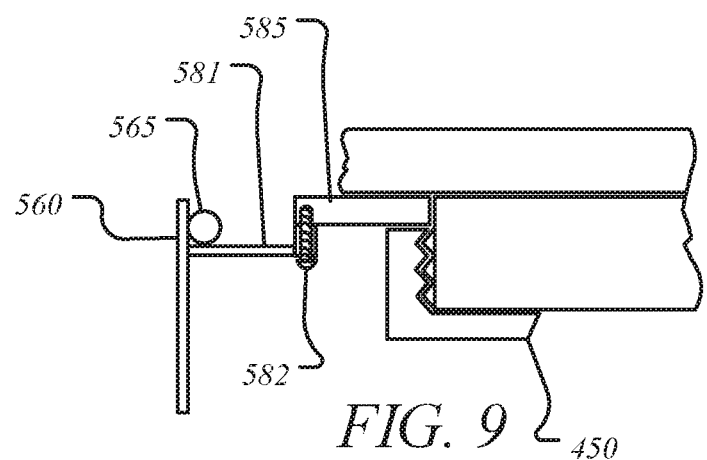
FIG. 9 illustrates a partial cross-sectional view of the exemplary embodiment of the flat panel ceiling light (lighting apparatus) according to exemplary implementations of the present disclosure in FIG. 8 with an embodiment of a quick-change shade cover attached.
Figure 15:
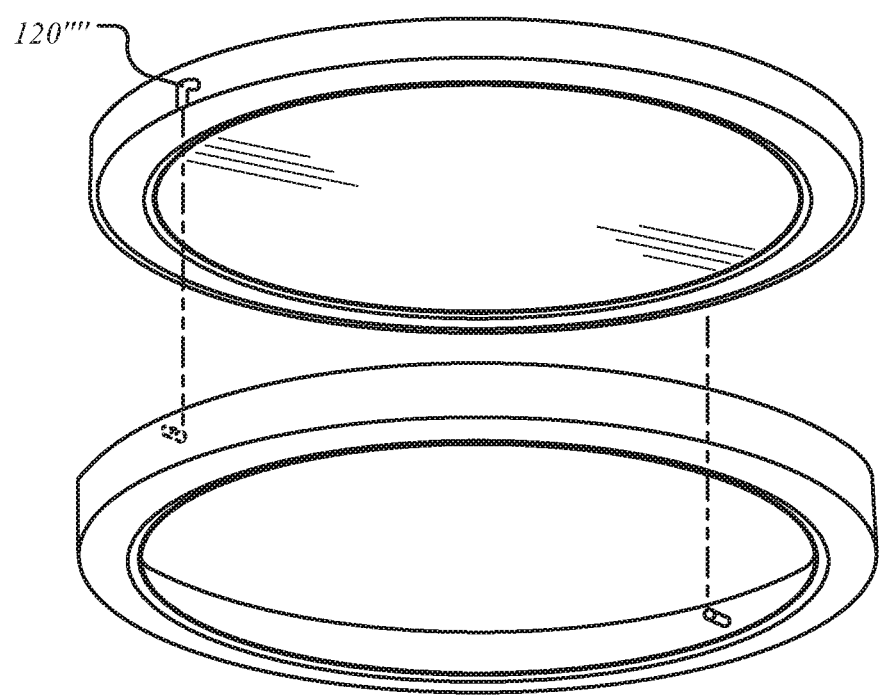
FIG. 15 illustrates another exemplary embodiment of the flat panel ceiling light (lighting apparatus) according to exemplary implementations of the present disclosure with one embodiment of a bayonet type connection.
Figure 16:
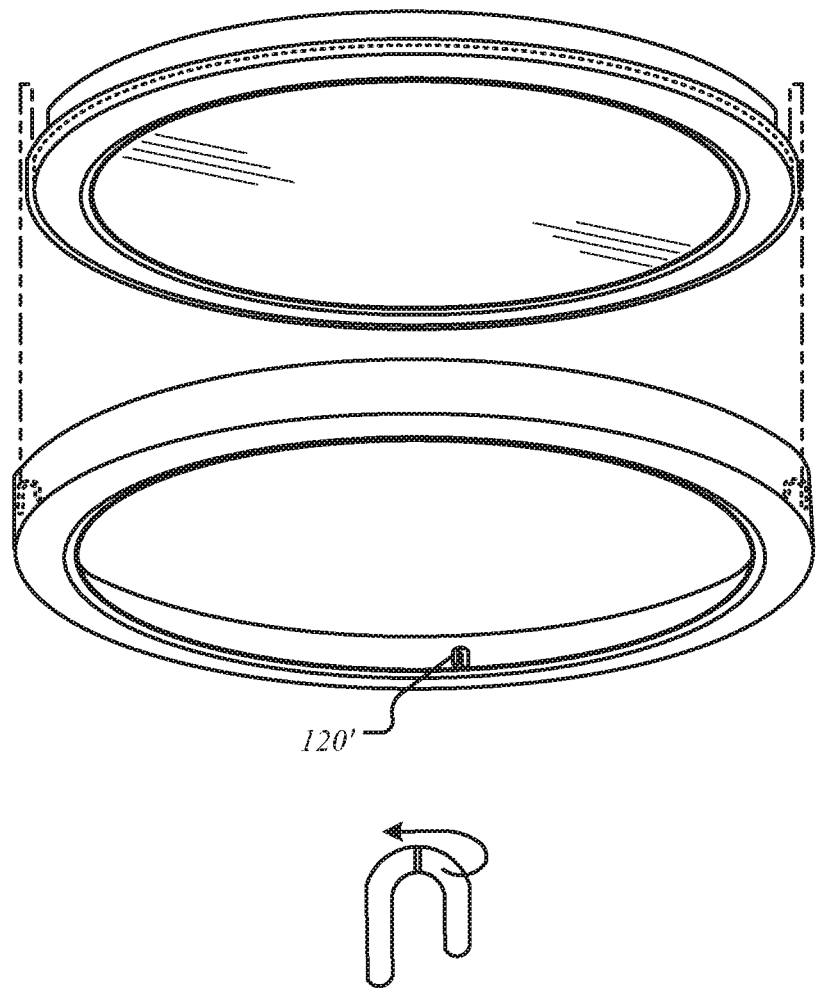
FIG. 16 illustrates another exemplary embodiment of the flat panel ceiling light (lighting apparatus) according to exemplary implementations of the present disclosure with one embodiment of a hook type connection.

The quick-connect adapter 120 may be formed on a portion of an outer surface of the base frame 100 (FIGS. 8 and 9). In some embodiments, the quick-connect adapter 120 may be formed on the entire outer surface of the base frame 100 (FIGS. 4A and 4B). Also, the quick-connect adapter 120 may allow the decorative element (such as trim piece 150, shade cover 250, and hanging element 350) to be quickly and easily mounted to the base frame 100, without using any tools. The quick-connect adapter 120 may include threads (e.g., 120 in FIG. 2), hooks (e.g., 120' in FIG. 16), magnets (120" not shown), hook-and-loop type connections (e.g., VELCRO®) (120'" not shown), and bayonet type connections (e.g., 120' in FIG. 15). The lighting apparatus may also be wired to a junction box (not shown) in the ceiling.

Figure 5:
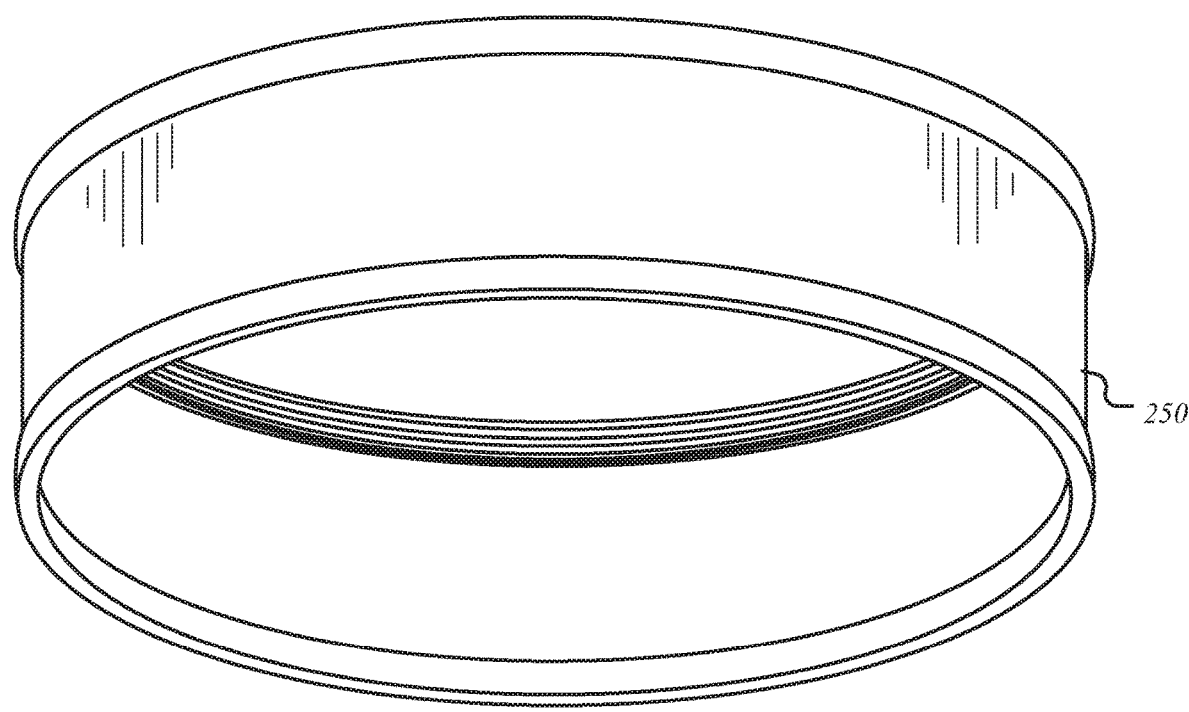
FIG. 5 illustrates another exemplary embodiment of the flat panel ceiling light (lighting apparatus) according to exemplary implementations of the present disclosure.
Figure 6:
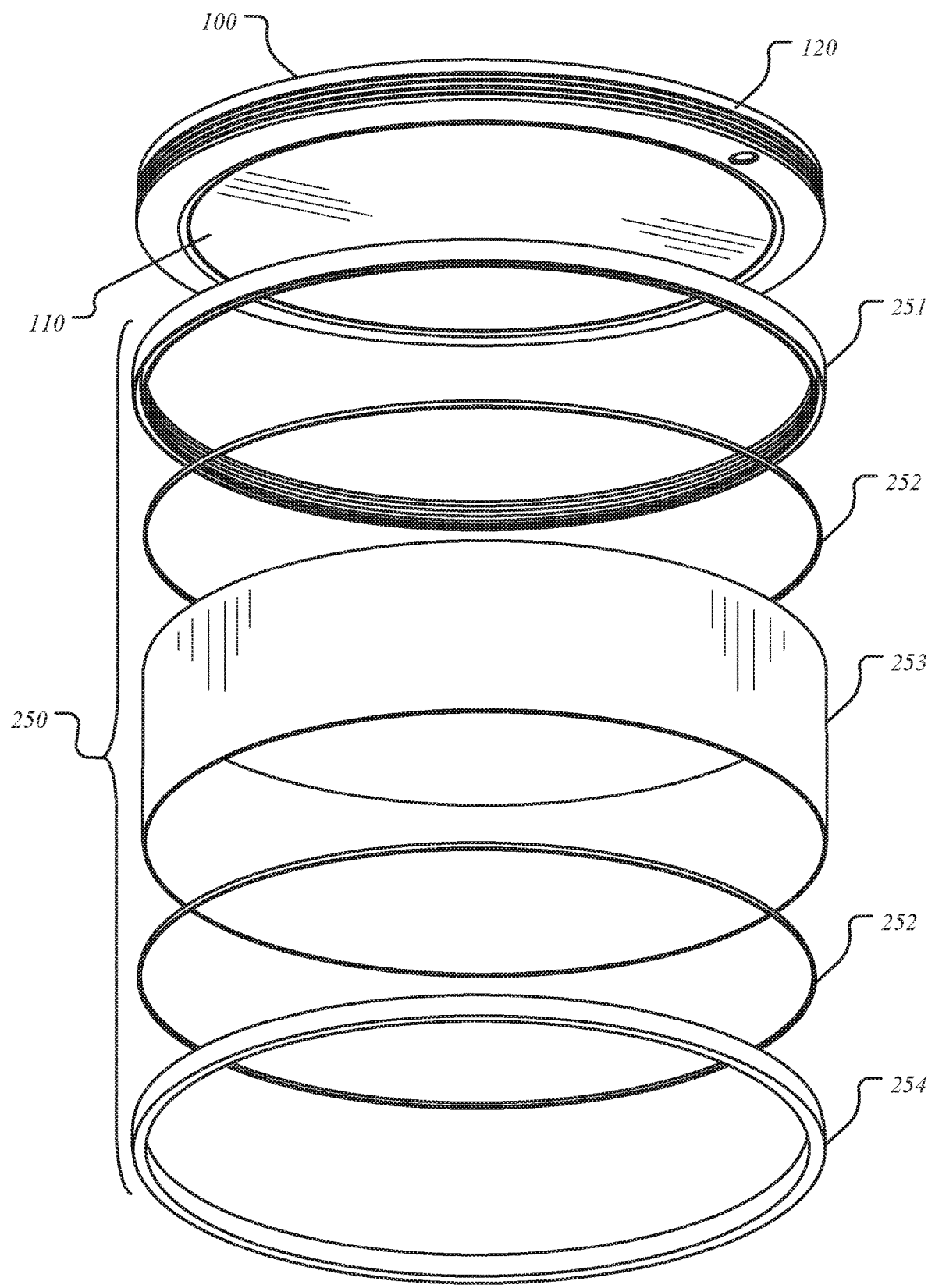
FIG. 6 illustrates the exemplary embodiment of the flat panel ceiling light (lighting apparatus) according to exemplary implementations of the present disclosure in FIG. 5 with the decorative element detached.
Figure 7:
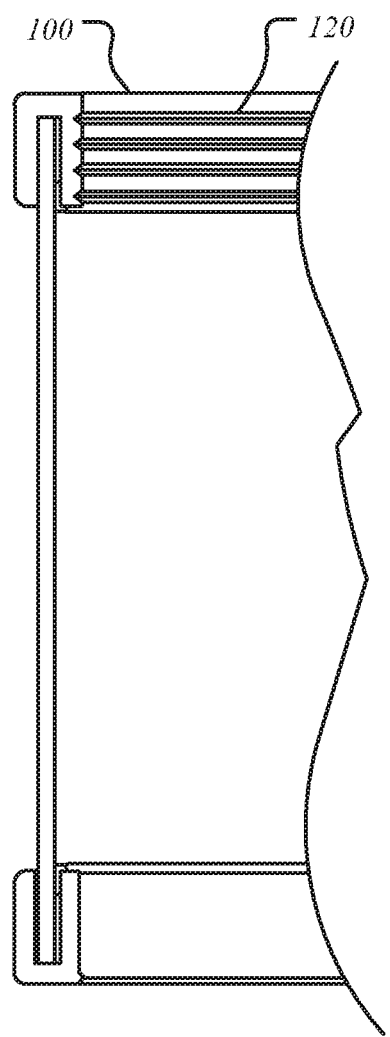
FIG. 7 illustrates a partial cross-sectional view of the exemplary embodiment of the flat panel ceiling light (lighting apparatus) according to exemplary implementations of the present disclosure in FIG. 5.
Figure 10:
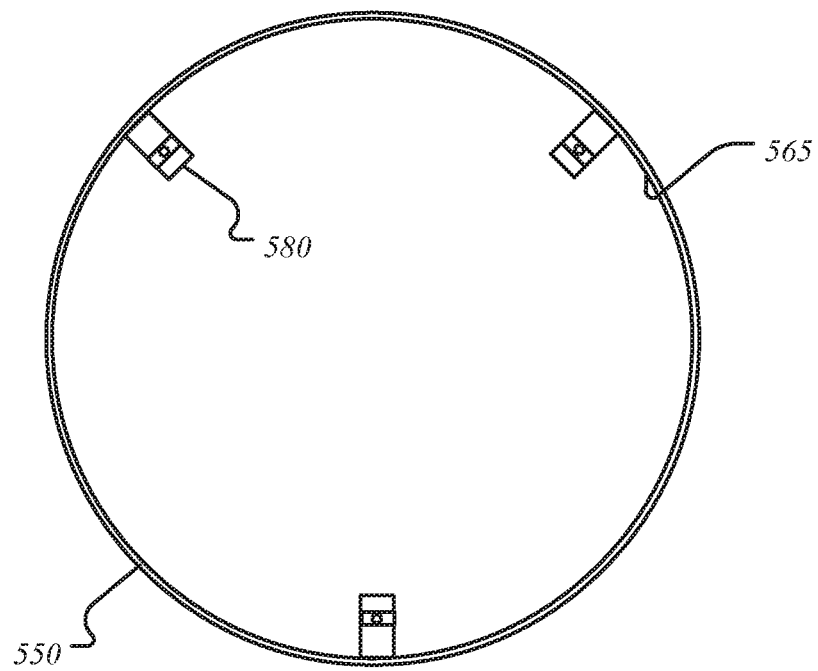
FIG. 10 illustrates a top view of an exemplary embodiment of the quick-change shade cover of FIG. 9.
Figure 11:
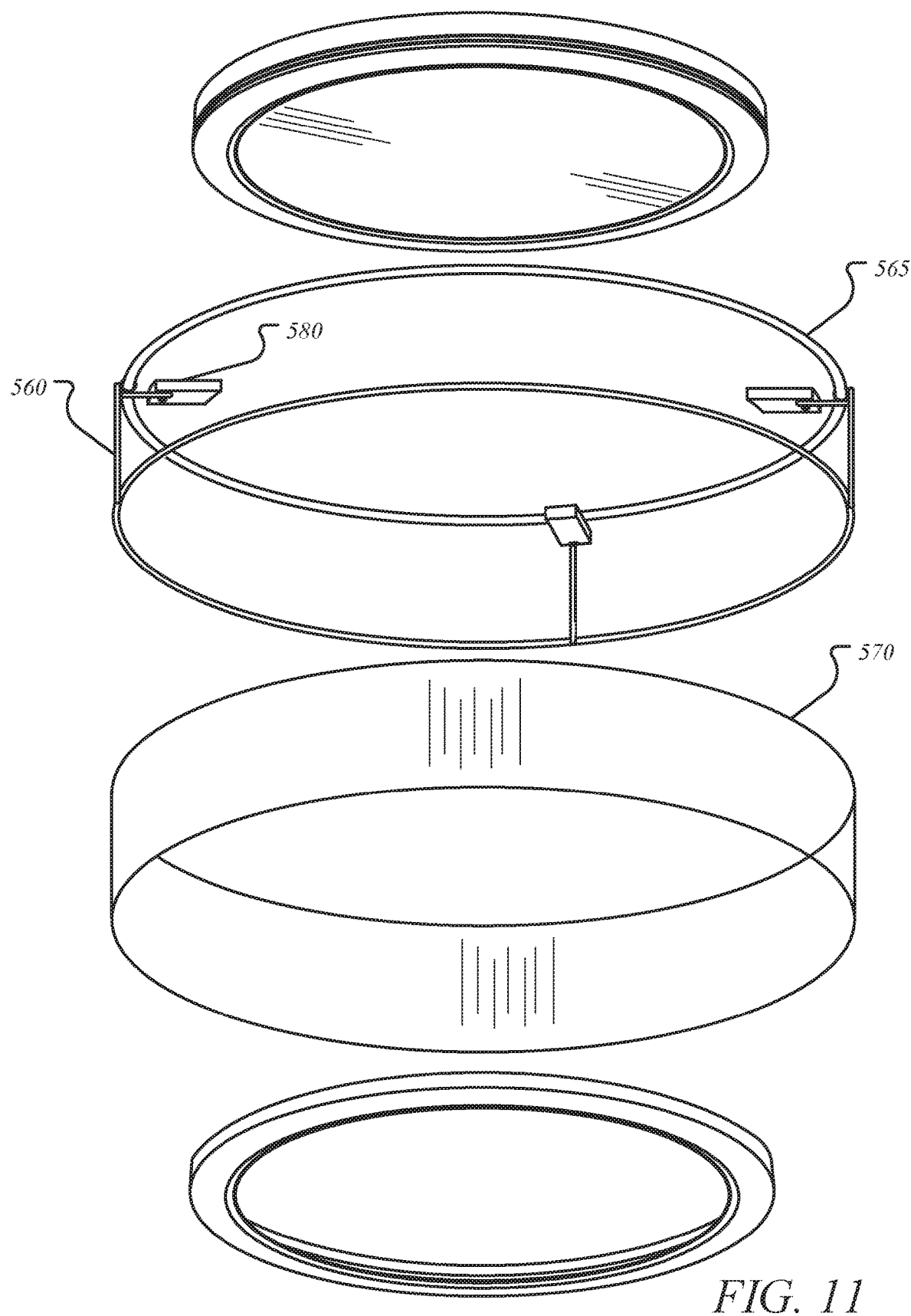
FIG. 11 illustrates the exemplary embodiment of the flat panel ceiling light (lighting apparatus) according to exemplary implementations of the present disclosure in FIG. 9 with an embodiment of a quick-change shade cover detached.

In an exemplary embodiment of the present disclosure, the decorative element is a shade cover 250 (FIGS. 5-7). The shade cover 250 can be one selected from a plurality of replaceable shade covers with different functions and designs. The shade cover 250 may be made of transparent material such as light guide material. The shade cover 250 may be made of opaque material so that the shade cover diffuses or redirects the light emitted from the light-emitting diode. The shade cover 250 may also be made of a fabric material that wraps around a wire frame 270 (FIGS. 9-11). The shade cover 250 may also hide the mounting structure, such as screws, used to mount the base frame to the ceiling.

In another exemplary embodiment of the present disclosure, the decorative element is a trim piece 150. The trim piece 150 can be one selected from a plurality of replaceable trim pieces with different functions and designs. The trim piece 150 may be made of a variety of materials such as steel, aluminum, brass, copper, titanium, plastic, acrylic, wood, glass, and fabric. The trim piece can also have a variety of designs, such as the trim piece 151 shown in FIG. 3. Like the shade cover 250, the trim piece may hide the mounting structure, such as screws, used to mount the base frame to the ceiling.

Figure 12:
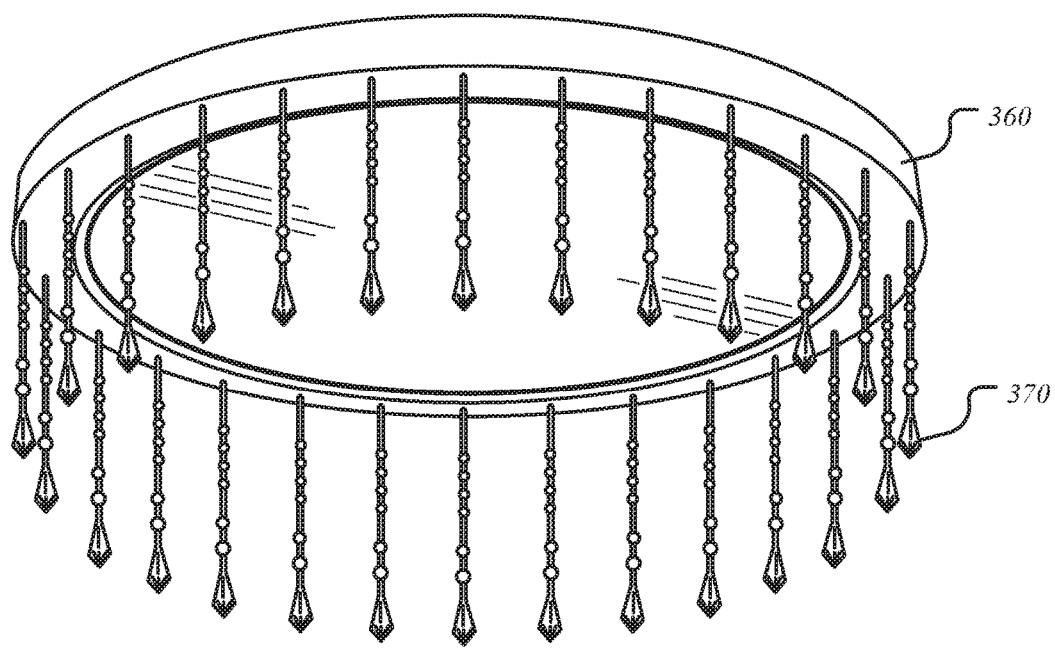
FIG. 12 illustrates another exemplary embodiment of the flat panel ceiling light (lighting apparatus) according to exemplary implementations of the present disclosure.
Figure 13:
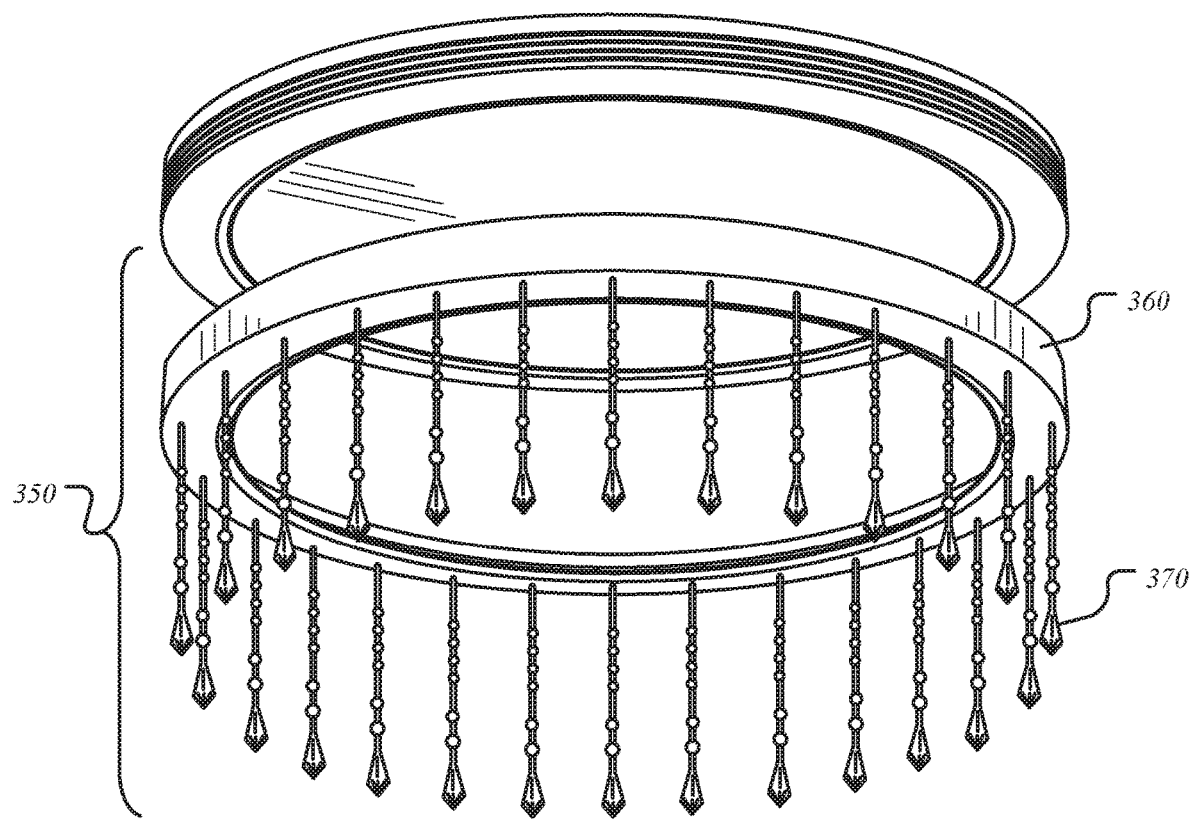
FIG. 13 illustrates the exemplary embodiment of the flat panel ceiling light (lighting apparatus) according to exemplary implementations of the present disclosure in FIG. 12 with the decorative element detached.

In another exemplary embodiment of the present disclosure, the decorative element is a hanging element 350 (FIGS. 12-13). The hanging element 350 may comprise a base ring 360 having a plurality of ornaments 370 that hang from the base ring 360. The base ring 360 can be the same design as the trim piece 150 except it includes any number of standard attachments for the ornaments to hang from. The base ring 360 may also be made of the same types of materials as the trim piece 150. The ornaments 370 can be any number of decorative items having different functions and designs. The ornaments 370 may be made of transparent material such as light guide material. The ornaments 370 may be made of opaque material so that the ornaments diffuse or redirect the light emitted from the light-emitting diode 130. The ornaments 370 may also be made of reflective material so that the ornaments 370 reflect light emitted from the light-emitting diode 130 in different directions. The ornaments 370 may also be made of any number of different materials for other aesthetic or design purposes and functions.

Figure 14:
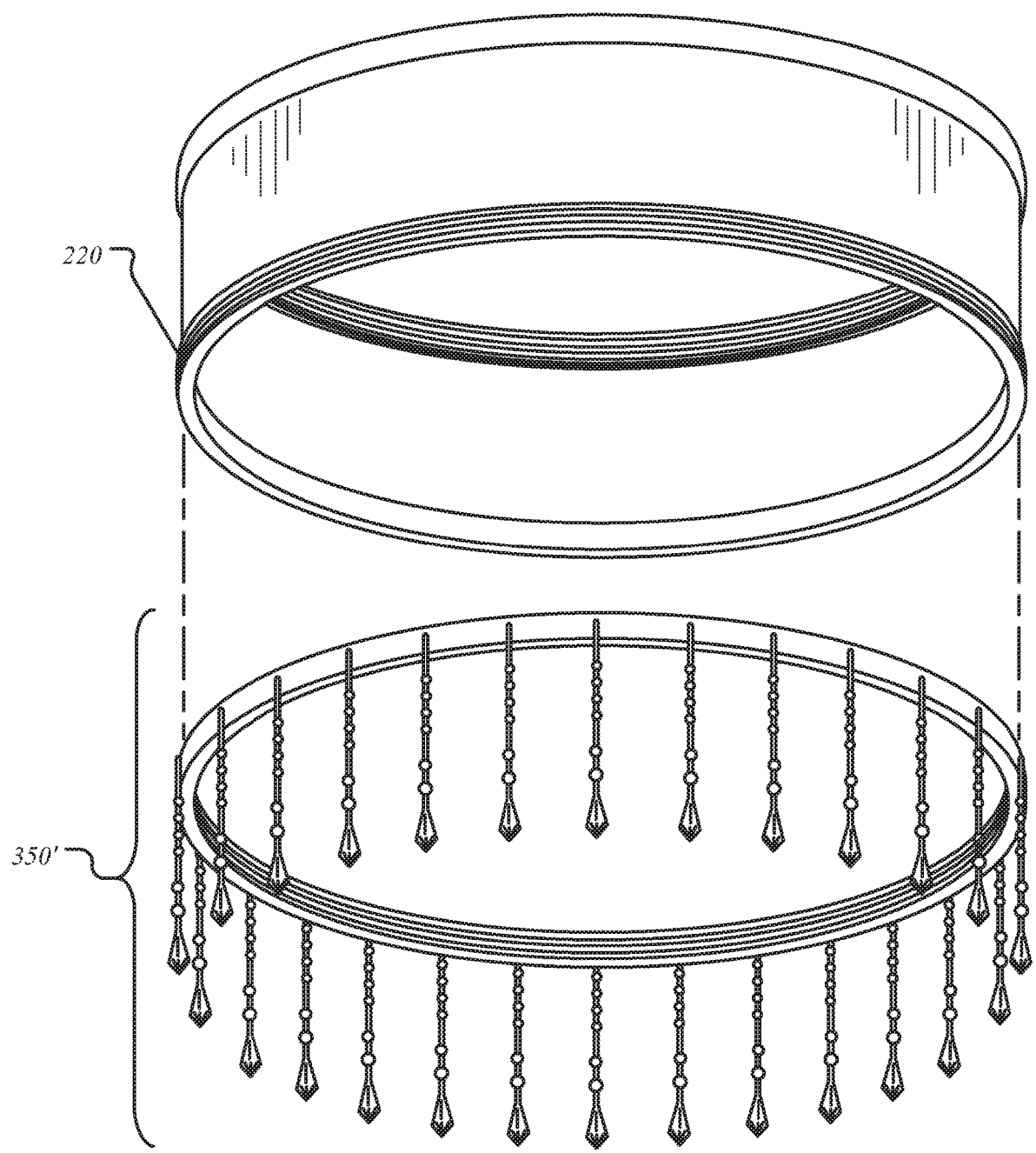
FIG. 14 illustrates another exemplary embodiment of the flat panel ceiling light (lighting apparatus) according to exemplary implementations of the present disclosure.
Figure 17:
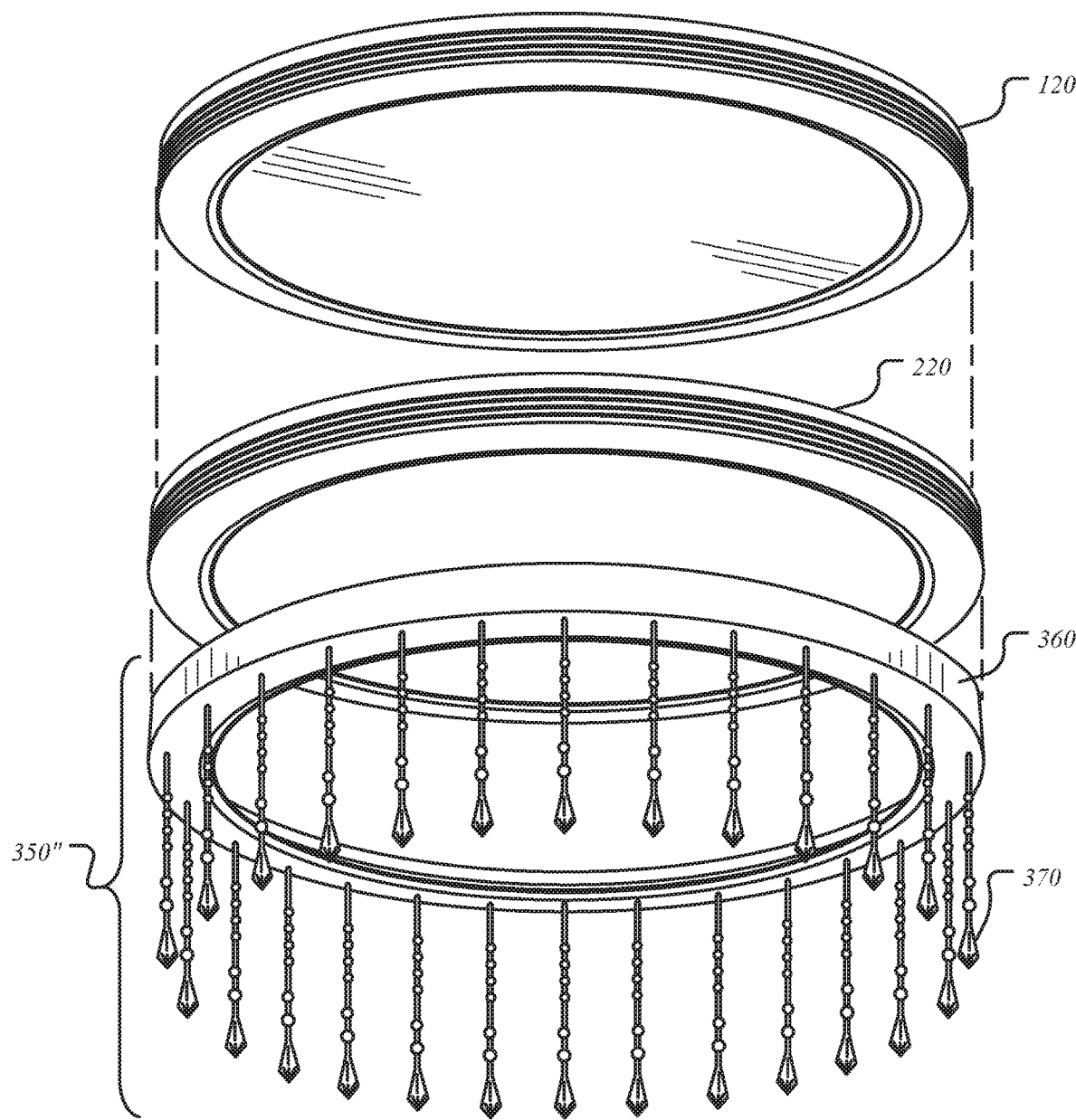
FIG. 17 illustrates another exemplary embodiment of the flat panel ceiling light (lighting apparatus) according to exemplary implementations of the present disclosure.

In yet another exemplary embodiment, the decorative elements may have their own quick-connect adapter 220 (FIGS. 14 and 17). As shown in FIG. 14, the decorative element quick-connect adapter 220 may allow multiple decorative elements to be quickly and easily mounted to one another, without using any tool. For example, a hanging element 350' may be mounted to a shade cover 250 via the decorative element quick connect adapter 220 on the shade cover 250, which itself is mounted to the base frame 100 via the quick-connect adapter 120 on the base frame. In this way, a user may quickly and easily attach a variety of decorative elements to one another as well as to the base frame 100 of the lighting apparatus.

FIGS. 1, 2, 3, 4A, and 4B illustrate a lighting system which may comprise a light-emitting diode flat-panel ceiling light (lighting apparatus) having a base frame 100, at least one light-emitting diode 130, and a light guide panel 110; a trim piece 150; and a quick-connect adapter 120 through which the trim piece 150 may be removably mounted to the base frame 100 without changing the light-emitting diode flat-panel ceiling light. The light-emitting diode flat-panel ceiling light may be wired to a junction box (not shown) in the ceiling. Also, the light guide panel 110 may be an edge-lit type. It should be understood than any decorative element (such as trim piece 150, shade cover 250, and hanging element 350) may be used in any of the illustrated embodiments, and that use of trim piece 150 in the following embodiments is merely exemplary.

The quick-connect adapter 120 may allow the trim piece 150 to be quickly and easily mounted to the base frame 100, without using any tool. The quick-connect adapter 120 may include threads (e.g., 120 in FIG. 2), hooks (e.g., 120' in FIG. 16), magnets (120" not shown), hook-and-loop type connections (e.g., VELCRO®) (120'" not shown), and bayonet type connections (e.g., 120"" in FIG. 15), although other types of connection technologies are certainly within the scope of this disclosure. The quick-connect adaptor 120 may be formed on an entire outer surface of the light-emitting diode flat-panel ceiling light (FIGS. 4A and 4B). Alternatively, the quick-connect adaptor 120 may be formed on a portion of an outer surface of the light-emitting diode flat-panel ceiling light (FIGS. 8 and 9).

Figure 3:
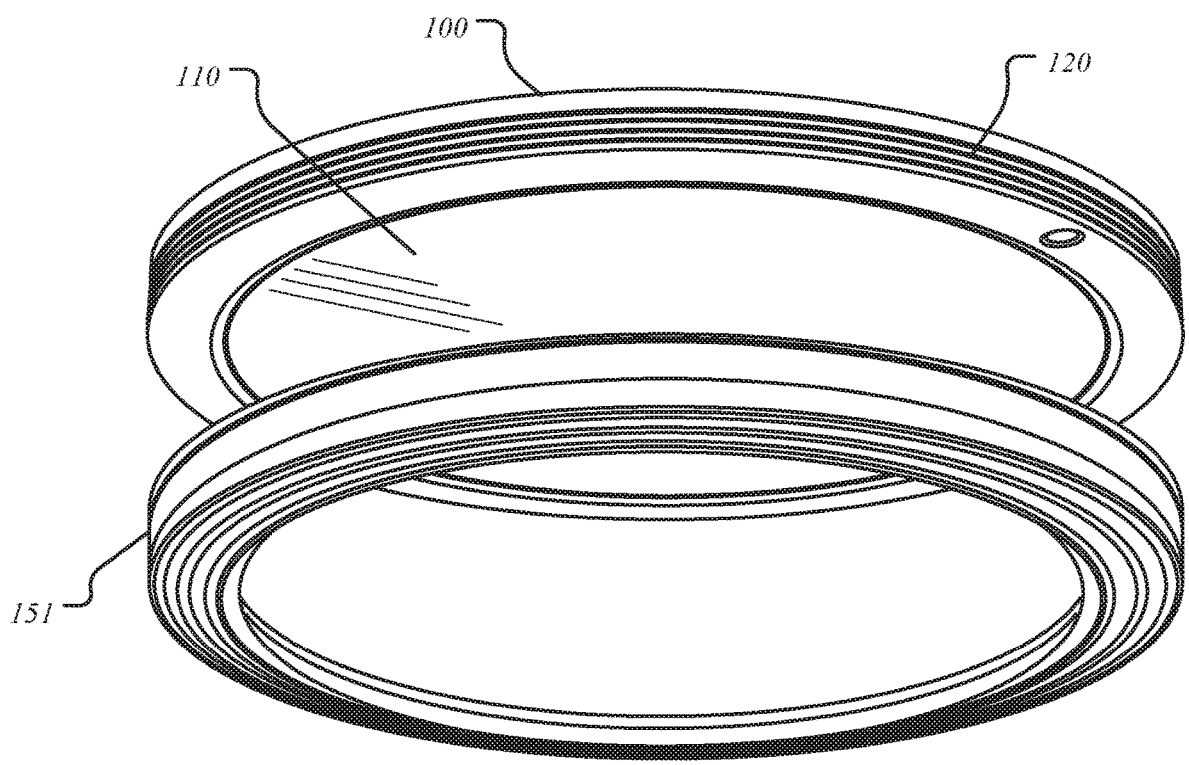
FIG. 3 illustrates another exemplary embodiment of the flat panel ceiling light (lighting apparatus) according to exemplary implementations of the present disclosure.

The trim piece 150 is one selected from a plurality of replaceable trim pieces with different functions and designs such as decorative designs of trim piece 151 in FIG. 3. The trim piece 150 may be made of transparent material such as light guide material. The trim piece 150 may be made of opaque material so that the trim piece hides the mounting structure, such as screws, used to mount the base frame to the ceiling. The trim piece 150 may cover the entire side surface of the base frame 100 and the trim piece 150 may be made of a transparent material or an opaque material. The trim piece 150 may cover the entire side surface of the base frame 100 while the quick-connect adapter 120 may cover a portion of the side surface of the base frame 100. In some embodiments, FIGS. 4A and 4B shows that both the trim piece 150 and the quick-connect adapter 120 may cover the entire side surface of the base frame 100.

The quick-connect adapter 120 may be formed on an entire side surface of an outer surface of the base frame 100. Also, the quick-connect adapter 120 may allow the decorative element (such as trim piece 150, shade cover 250, and hanging element 350) to be quickly and easily mounted to the base frame 100, without using any tools. The quick-connect adapter 120 may include threads (e.g., 120 in FIG. 2), hooks (e.g., 120' in FIG. 16), magnets (120" not shown), hook-and-loop type connections (e.g., VELCRO®) (120''' not shown), and bayonet type connections (e.g., 120'''' in FIG. 15), although other types of connection technologies are certainly within the scope of this disclosure. The lighting apparatus may be wired to a junction box (not shown) in the ceiling. The base frame 100 may be formed of an opaque material so that the light may not be outputted from the outer surface of the base frame 100. The opaque material may include organic and inorganic materials such as polymers, metals, ceramic materials and composites.

The base frame 100 may include two parts. In some embodiments, the base frame 100 may be integrally formed into one piece. The base frame 100 may include a slot to which at least one light-emitting diode 130 is installed. The light-emitting diodes 130 may be an edge-lit type and emit light to an edge of the light guide panel 110. The light guide panel 110 may have a flat surface. In some embodiments, the light guide panel 110 may have a curved surface. The light output from the light guide panel 110 can be homogeneous in all directions. In some embodiments, the light output from the light guide panel 110 may be controlled to focus to a specific angle less than 180° for a different lighting purpose.

The trim piece 150 may have a decorative element quick-connect adapter 220 formed on its outer surface (FIG. 17). The decorative element quick-connect adapter 220 is formed on the outer surface of the trim piece 150 and may cover the entire outer side surface of the trim piece 150. In some embodiments, the decorative element quick-connect adapter 220 formed on the outer surface of the trim piece 150 may cover a portion of the side surface of the trim piece 150. In another embodiment, the trim piece 150 may have a decorative element quick-connect adapter 220 formed on its inner surface. The decorative element quick-connect adapter 220 is formed on the inner surface of the trim piece 150 and may cover the entire inner side surface of the trim piece 150. In some embodiments, the decorative element quick-connect adapter 220 formed on the inner surface of the trim piece 150 may cover a portion of the inner side surface of the trim piece 150. The decorative element quick-connect adapter 220 on the trim piece 150 may allow another decorative element (such as trim piece 150', shade cover 250', and hanging element 350') to be quickly and easily mounted to the trim piece 150, without using any tools. The decorative element quick-connect adapter 220 may include threads (e.g., 120 in FIG. 2), hooks (e.g., 120' in FIG. 16), magnets (120" not shown), hook-and-loop type connections (e.g., VELCRO®) (120''' not shown), and bayonet type connections (e.g., 120'''' in FIG. 15).

In some embodiments, another decorative element (such as trim piece 150", shade cover 250", and hanging element 350"), having a greater diameter than trim piece 150 may be mounted onto the decorative element quick-connect adapter 220 of the trim piece 150. That is, a diameter of a decorative element, such as trim piece 150, can be extended by stacking or attaching multiple decorative elements together. In some embodiments, the decorative element quick-connect adapter 220 formed on the trim piece 150 may cover a bottom portion of the side surface of the trim piece 150. Another decorative element of similar or same diameter as trim piece 150 (such as trim piece 150', shade cover 250', and hanging element 350') may be mounted to the bottom of trim piece 150 through the decorative element quick-connect adapter 220. That is, a length of the decorative element, such as a height, may be extended by stacking, or attaching, multiple decorative elements together.

The shade cover 250 can be one selected from a plurality of replaceable shade covers with different functions and designs. The shade cover 250 may be made of a variety of materials such as steel, aluminum, brass, copper, titanium, plastic, acrylic, wood, glass, and fabric. The shade cover 250 may also be made of transparent material such as light guide material. The shade cover 250 may also be made of opaque material so that the shade cover diffuses or redirects the light emitted from the light-emitting diode. The shade cover 250 may be made of as a single, unitary piece. Alternatively, the shade cover 250 may be made of multiple pieces.

FIG. 6 illustrates an exemplary embodiment of shade cover 250. The shade cover 250 can include a top ring 251 and bottom ring 254, each of which are attached to decorative shade element 253. In between the decorative shade element 253 and the top ring 251 and bottom ring 254 are gaskets 252. The decorative shade element 253 can be attached to the top ring 251 and bottom ring 254 via press-fit using gaskets 252. The decorative shade element 253 can also be attached to the top ring 251 and bottom ring 254 using adhesive or any other known attachment means.

FIG. 8 illustrates a lighting apparatus which may comprise a quick-connect adapter 120 formed on a portion of the side surface of an outer surface of the base frame 100 through which a decorative element may be removably mounted to the base frame 100 without changing the lighting apparatus. When trim piece 450 is mounted to the base frame 100 using quick-connect adapter 120, there is a gap between the trim piece 450 and the base frame 100 for a shade cover 550 (described below) to attach.

FIGS. 9-11 show another exemplary embodiment of a shade cover 550 that may be made with a fabric material 570 that wraps around a wire frame 560. The wire frame 560 includes tabs 580 that extend radially inward from the wire frame 560. The tabs 580 include a frame ring 565 that is attached to a first extending portion 581. The first extending portion 581 is removably coupled to the second extending portion 585 via fasteners 582. The shade cover 550 can be mounted to the base frame 100 of FIG. 8 by utilizing another decorative element and tabs 580. For example, shade cover 550 with tabs 580 may be placed concentric with the base frame 100. When another decorative element, such as trim piece 450, is mounted to the base frame 100 using quick-connect adapter 120, the tabs 580 of shade cover 550 are press fit between the base frame 100 and trim piece 450. The shade cover 550 can be quickly and easily changed by simply reversing the foregoing order. If shade cover 550 is not mounted to the base frame 100, a spacer 460 is placed between the between the base frame 100 and trim piece 450 to fill the gap.

In another exemplary embodiment of a lighting system (not shown) may comprise a light-emitting diode flat-panel ceiling light (lighting apparatus) having a base frame 100, at least one light-emitting diode 130, and a light guide panel 110; a trim piece 150; and a quick-connect adapter 120 through which the trim piece 150 with functional cover 160 may be removably mounted to the base frame 100 without changing the light-emitting diode flat-panel ceiling light. The light-emitting diode flat-panel ceiling light may be wired to a junction box (not shown) in the ceiling. Also, the light guide panel 110 may be an edge-lit type.

The trim piece 150 may have an accent light function using transparent portions 160 to receive light emitted from the light-emitting diodes 130 passing through the transparent base frame 100. The trim piece 150 may be made of a transparent material such as light guide material so that light may pass through the trim piece 150 to pass further through the transparent portions 160 for the light-emitting function. The transparent portions 160 may have different colors and may be formed of different materials including plastic, glass and light guide materials. The trim piece 150 may cover the entire side surface of the base frame 100 and the trim piece 150 may be partially made of a transparent material or an opaque material.

This method and the above embodiments of lighting apparatus and lighting system provide advantages including easy and fast mounting of shade covers, including decorative covers and functional covers, to emit light of various frequencies, preventing breakage and safety concerns, and providing a way to store the decorative covers by attaching one to another.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Other implementations are also contemplated.

The invention claimed is:

1. A lighting system, comprising:
a light-emitting diode flat-panel ceiling light having
a base frame,
at least one light-emitting diode, and
a light guide panel;
a shade cover,
wherein the base frame includes a first quick-connect adapter through which the shade cover is removably mounted to the base frame without changing the light-emitting diode flat-panel ceiling light, and wherein the shade cover is replaced with an alternate shade cover; and
a second quick-connect adapter disposed on the shade cover, wherein the second quick-connect adapter is configured to removably mount a decorative element to the shade cover.

2. The lighting system of claim 1, wherein the first quick-connect adapter involves not more than one step to mount the shade cover to the base frame, without using any tool.

3. The lighting system of claim 1, wherein the first quick-connect adapter includes at least one or more of bayonet type connections, threaded connections, hooks, hook-and-loop type connections, and magnets.

4. The lighting system of claim 1, wherein the light-emitting diode flat-panel ceiling light further comprises a mirror to reflect light emitted from the at least one light-emitting diode to the light guide panel.

5. The lighting system of claim 1, wherein the first quick-connect adaptor forms on entire side surface of outer surface of the light-emitting diode flat-panel ceiling light.

6. The lighting system of claim 1, wherein the at least one light-emitting diode being an edge-lit type.

7. The lighting system of claim 1, wherein the shade cover is made of transparent material.

8. The lighting system of claim 7, wherein the shade cover is made of light guide material.

9. The lighting system of claim 1, wherein the shade cover is made of opaque material.

10. The lighting system of claim 9, wherein the shade cover hides a mounting structure used to mount light-emitting diode flat-panel ceiling light to a surface.

11. The lighting system of claim 1, wherein the shade cover is one selected from a plurality of replaceable shade covers with different functions and designs and wherein the alternate shade cover is a different one selected from the plurality of replaceable shade covers with different functions and designs.

12. The lighting system of claim 1, wherein the light-emitting diode flat-panel ceiling light is wired to a junction box.

13. A lighting apparatus, comprising:
a base frame;
at least one light-emitting diode;
a light guide panel;
a first quick-connect adapter disposed on the base frame through which a first decorative element is removably mounted to the base frame without changing the lighting apparatus, wherein the first decorative element is replaced with an alternate decorative element; and
a second quick-connect adapter disposed on the first decorative element, wherein the second quick-connect adapter is configured to removably mount a second decorative element to the first decorative element.

14. The lighting apparatus of claim 13, wherein the first decorative element includes at least one or more of a trim piece, a shade cover, and a hanging element.

15. The lighting apparatus of claim 13, wherein the first quick-connect adapter is formed on an outer surface of the base frame.

16. The lighting apparatus of claim 13, wherein the first quick-connect adapter involves one step to mount the decorative element to the base frame.

17. The lighting apparatus of claim 13, wherein the first quick-connect adapter includes at least one or more of bayonet type connections, threaded connections, hooks, hook-and-loop type connections, and magnets.

18. The lighting apparatus of claim 13, wherein the lighting apparatus is wired to a junction box.

19. The lighting apparatus of claim 13, wherein the alternate decorative element contains a third quick-connect adapter through which a third decorative element is removably mounted to the alternate decorative element.

20. A method of lighting, comprising:
forming a first quick-connect adapter on an outer surface of a lighting apparatus;
removably mounting a first decorative element through the first quick-connect adapter to the lighting apparatus, including:
a base frame,
at least one light-emitting diode, and
a light guide panel;
forming a second quick-connect adapter on an outer surface of the first decorative element; and
removably mounting a second decorative element through the second quick-connect adapter to the first decorative element.

* * * * *